US008849894B2

(12) United States Patent
Mueller et al.

(10) Patent No.: US 8,849,894 B2
(45) Date of Patent: Sep. 30, 2014

(54) METHOD AND SYSTEM USING PARAMETERIZED CONFIGURATIONS

(75) Inventors: Thomas Mueller, Oberkirch (DE); Ingo Zenz, Epfenbach (DE)

(73) Assignee: SAP AG, Walldorf (DE)

( * ) Notice: Subject to any disclaimer, the term of this patent is extended or adjusted under 35 U.S.C. 154(b) by 1227 days.

(21) Appl. No.: 11/323,438

(22) Filed: Dec. 30, 2005

(65) Prior Publication Data

US 2007/0156432 A1 Jul. 5, 2007

(51) Int. Cl.
*G06F 15/16* (2006.01)
*G06Q 99/00* (2006.01)

(52) U.S. Cl.
CPC .................................... *G06Q 99/00* (2013.01)
USPC ........... 709/203; 709/201; 709/202; 709/220; 709/221; 709/222

(58) Field of Classification Search
USPC .......... 709/227, 228, 220–226, 201, 202, 203
See application file for complete search history.

(56) References Cited

U.S. PATENT DOCUMENTS

| | | | | |
|---|---|---|---|---|
| 5,479,599 | A | 12/1995 | Rockwell et al. | |
| 5,608,865 | A | 3/1997 | Midgely et al. | |
| 5,758,154 | A | 5/1998 | Qureshi | |
| 5,832,503 | A * | 11/1998 | Malik et al. | 709/223 |
| 5,996,012 | A | 11/1999 | Jarriel | |
| 6,041,347 | A * | 3/2000 | Harsham et al. | 709/220 |
| 6,055,227 | A * | 4/2000 | Lennert et al. | 370/254 |
| 6,148,277 | A | 11/2000 | Asava et al. | |
| 6,161,176 | A | 12/2000 | Hunter et al. | |
| 6,209,018 | B1 | 3/2001 | Ben-Shachar et al. | |
| 6,314,460 | B1 | 11/2001 | Knight et al. | |
| 6,341,372 | B1 | 1/2002 | Datig | |
| 6,397,378 | B1 | 5/2002 | Grey et al. | |
| 6,421,719 | B1 * | 7/2002 | Lewis et al. | 709/224 |
| 6,490,690 | B1 | 12/2002 | Gusler et al. | |
| 6,567,849 | B2 * | 5/2003 | Ludovici et al. | 709/223 |
| 6,735,691 | B1 | 5/2004 | Capps et al. | |
| 6,832,298 | B2 | 12/2004 | Fujii et al. | |
| 6,871,221 | B1 | 3/2005 | Styles | |
| 6,898,703 | B1 | 5/2005 | Ogami et al. | |
| 6,925,646 | B1 | 8/2005 | Korenshtein et al. | |
| 6,950,931 | B2 | 9/2005 | Wedlake | |

(Continued)

FOREIGN PATENT DOCUMENTS

| | | |
|---|---|---|
| EP | 1486867 | 12/2004 |
| GB | 2374687 | 10/2002 |

(Continued)

OTHER PUBLICATIONS

Int'l Application No. PCT/EP2006/012357, Int'l Search Report and Written Opinion dated Mar. 29, 2007, 5 pages.

(Continued)

*Primary Examiner* — Melanie Jagannathan
*Assistant Examiner* — Najeebuddin Ansari
(74) *Attorney, Agent, or Firm* — Schwegman Lundberg & Woessner, P.A.

(57) ABSTRACT

A system and method to reduce configuration administration using system independent configuration parameters. A persistent storage unit returns system independent configuration entries. Some of the entries contain parameters. A configuration resolver resolves the parameter to obtain a static value for the configuration entry that may be passed to a configuration consumer.

22 Claims, 4 Drawing Sheets

(56) References Cited

U.S. PATENT DOCUMENTS

| | | | | |
|---|---|---|---|---|
| 6,996,517 | B1 | 2/2006 | Papaefstathiou | |
| 7,051,097 | B1 * | 5/2006 | Pecina | 709/224 |
| 7,054,924 | B1 | 5/2006 | Harvey et al. | |
| 7,167,974 | B2 | 1/2007 | Roth et al. | |
| 7,188,335 | B1 | 3/2007 | Darr et al. | |
| 7,246,345 | B1 | 7/2007 | Sharma et al. | |
| 7,260,818 | B1 | 8/2007 | Iterum et al. | |
| 7,320,007 | B1 | 1/2008 | Chang | |
| 7,343,601 | B2 | 3/2008 | Azagury et al. | |
| 7,373,661 | B2 * | 5/2008 | Smith et al. | 726/15 |
| 7,412,687 | B2 | 8/2008 | Goodwin et al. | |
| 7,447,701 | B2 | 11/2008 | Agarwal et al. | |
| 7,480,643 | B2 * | 1/2009 | Barsness et al. | 707/2 |
| 8,539,496 | B1 * | 9/2013 | Anand et al. | 718/104 |
| 2003/0041235 | A1 | 2/2003 | Meyer | |
| 2003/0055529 | A1 * | 3/2003 | Aosawa | 700/220 |
| 2003/0055905 | A1 * | 3/2003 | Nishiyama et al. | 709/206 |
| 2003/0221094 | A1 | 11/2003 | Pennarun | |
| 2003/0225793 | A1 * | 12/2003 | Chakraborty | 707/200 |
| 2003/0225867 | A1 | 12/2003 | Wedlake | |
| 2004/0059811 | A1 * | 3/2004 | Sugauchi et al. | 709/224 |
| 2004/0098408 | A1 * | 5/2004 | Gensel | 707/104.1 |
| 2004/0117452 | A1 | 6/2004 | Lee et al. | |
| 2004/0139193 | A1 * | 7/2004 | Refai et al. | 709/224 |
| 2004/0162930 | A1 | 8/2004 | Forin et al. | |
| 2004/0187140 | A1 | 9/2004 | Aigner et al. | |
| 2004/0205584 | A1 | 10/2004 | Pezzanite | |
| 2004/0230787 | A1 | 11/2004 | Blumenau et al. | |
| 2005/0005005 | A1 | 1/2005 | Styles et al. | |
| 2005/0050175 | A1 | 3/2005 | Fong et al. | |
| 2005/0065993 | A1 | 3/2005 | Honda et al. | |
| 2005/0071195 | A1 | 3/2005 | Cassel et al. | |
| 2005/0076005 | A1 * | 4/2005 | Chefalas et al. | 707/2 |
| 2005/0085937 | A1 | 4/2005 | Goodwin et al. | |
| 2005/0091291 | A1 * | 4/2005 | Kaler et al. | 707/203 |
| 2005/0144428 | A1 | 6/2005 | Rothman et al. | |
| 2005/0144528 | A1 | 6/2005 | Bucher et al. | |
| 2005/0144610 | A1 | 6/2005 | Zenz | |
| 2005/0177827 | A1 * | 8/2005 | Fong et al. | 717/171 |
| 2005/0182831 | A1 * | 8/2005 | Uchida et al. | 709/220 |
| 2005/0188367 | A1 * | 8/2005 | Oberholtzer | 717/168 |
| 2005/0240667 | A1 | 10/2005 | Koegel | |
| 2005/0289169 | A1 | 12/2005 | Adya et al. | |
| 2006/0041595 | A1 * | 2/2006 | Taguchi et al. | 707/200 |
| 2006/0041881 | A1 | 2/2006 | Adkasthala | |
| 2006/0047792 | A1 * | 3/2006 | Dharmarajan et al. | 709/220 |
| 2006/0047798 | A1 | 3/2006 | Feinleib et al. | |
| 2006/0064673 | A1 | 3/2006 | Rogers et al. | |
| 2006/0123409 | A1 | 6/2006 | Jordan, III et al. | |
| 2006/0150178 | A1 | 7/2006 | Jerrard-Dunne et al. | |
| 2006/0165123 | A1 | 7/2006 | Jerrard-Dunne et al. | |
| 2006/0190579 | A1 | 8/2006 | Rachniowski et al. | |
| 2006/0200552 | A1 * | 9/2006 | Beigi et al. | 709/224 |
| 2006/0242626 | A1 | 10/2006 | Pham et al. | |
| 2006/0242634 | A1 | 10/2006 | Fleischer et al. | |
| 2007/0094359 | A1 | 4/2007 | Lamoureux | |
| 2007/0118654 | A1 | 5/2007 | Jamkhedkar | |
| 2007/0118888 | A1 | 5/2007 | Styles | |
| 2007/0136548 | A1 * | 6/2007 | Mane | 711/170 |
| 2007/0143480 | A1 * | 6/2007 | Arroyo et al. | 709/226 |
| 2007/0156388 | A1 | 7/2007 | Kilian et al. | |
| 2007/0156389 | A1 | 7/2007 | Kilian et al. | |
| 2007/0156641 | A1 | 7/2007 | Mueller | |
| 2007/0156715 | A1 | 7/2007 | Mueller | |
| 2007/0156717 | A1 | 7/2007 | Zenz et al. | |
| 2007/0157010 | A1 | 7/2007 | Zenz | |
| 2007/0157172 | A1 | 7/2007 | Zenz et al. | |
| 2007/0157185 | A1 | 7/2007 | Semerdzhiev | |
| 2007/0162892 | A1 | 7/2007 | Zenz et al. | |
| 2007/0165937 | A1 | 7/2007 | Markov et al. | |
| 2007/0168965 | A1 | 7/2007 | Zenz | |
| 2007/0257715 | A1 | 11/2007 | Semerdzhiev et al. | |

FOREIGN PATENT DOCUMENTS

| | | | |
|---|---|---|---|
| WO | WO-96/26588 | | 8/1996 |
| WO | WO2004109978 | | 12/2004 |
| WO | WO-2004109978 | A1 | 12/2004 |
| WO | WO2005/045670 | | 5/2005 |
| WO | WO-2007076944 | A1 | 7/2007 |

OTHER PUBLICATIONS

Int'l Application No. PCT/EP2006/012358, Int'l Search Report and Written Opinion dated Jun. 14, 2007, 5 pages.

Int'l Application No. PCT/EP2006/012421, Int'l Search Report and Written Opinion dated Oct. 2, 2007, 14 pages.

Office Action mailed Feb. 20, 2008 for U.S. Appl. No. 11/322,608, (Feb. 20, 2008), Whole Document.

Office Action mailed Jan. 8, 2008 for U.S. Appl. No. 11/322,607, (Jan. 18, 2008), Whole Document.

Office Action mailed Mar. 19, 2008 for U.S. Appl. No. 11/322,701, (Mar. 19, 2008), Whole Document.

Anonymous, "Using a Template Processor to Simplify Programming", Research Disclosure, Mason Publications, Hampshire, GB, vol. 41, No. 413, (Sep. 1, 1998), 1-3.

Heiss, Kurt, Oracle Process Manager and Notification Server Administrator's Guide, 10g Release 2 (10.1.2), Dec. 2004, XP002449016; Redwood City, CA, USA, Retrieved from the Internet: URL: http://download.oracle.com/docs/cd/B14 [ret'd on Aug. 31, 2007], (Dec. 2004), pp. 1-1 to pp. 1-26 and pp. 3-1 to pp. 3-30.

Non-Final Office Action for U.S. Appl. No. 11/322,400 mailed May 23, 2008, whole document.

Non-Final Office Action for U.S. Appl. No. 11/322,401 mailed May 22, 2008, whole document.

Non-Final Office Action for U.S. Appl. No. 11/322,607 mailed Jun. 26, 2008, whole document.

Final Office Action for U.S. Appl. No. 11/322,608 mailed Sep. 4, 2008, whole document.

Final Office Action for U.S. Appl. No. 11/322,401 mailed Nov. 19, 2008, whole document.

Non-Final Office Action for U.S. Appl. No. 11/323,110 mailed Nov. 26, 2008, whole document.

Non-Final Office Action for U.S. Appl. No. 11/322,509, mailed Jan. 14, 2009, whole document.

Non-Final Office Action for U.S. Appl. No. 11/324,125, mailed Jan. 23, 2009, whole document.

Non-Final Office Action for U.S. Appl. No. 11/322,511, mailed Jan. 22, 2009, whole document.

Non-Final Office Action for U.S. Appl. No. 11/322,608, mailed Feb. 13, 2009, whole document.

Final Office Action for U.S. Appl. No. 11/322,701, mailed Sep. 2, 2008, whole document.

Non-Final Office Action for U.S. Appl. No. 11/322,969, mailed Apr. 1, 2009, whole document.

BIS Techdev, "J2EEEngineBoostrap J2EE Engine Bootstrap", printed on Sep. 26, 2005, https://bis.wdf.sap.corp/twiki/bin/view/Techdev/J2EEEngineBootstrap, pp. 1-15.

Accomazzi, Alberto, et al., "Mirroring the Ads Bibliographic Databases", Astronomical Analysis Software and Systems VII, ASP Conference Series, vol. 145, (1998), 395-399.

Bartell, Randy L., et al., "The Mediaxact System—A Framework for Personalized Electronic Commerce Systems", Bell Labs Technical Journal, vol. 4, Issues 153-173, (Apr.-Jun. 1999).

Cutler, Ellie, "Sco Unix in a Nutsell", O'Reilly & Associates, Inc., Cambridge, MA, (Jan. 1994), 154-158.

Duquette, William H., et al., "Data Definition and Code Generation in TCL", RIDE-VE '99, Sydney, Australia, (Mar. 23-24, 1999), pp. 1-10.

Feiler, Peter H., "Software Process Support Through Software Configuration Management", 1990, IEEE, pp. 58-60.

Fernandez, Mary, et al., "Silkroute: Trading Between Relations and XML", Computer Networks, vol. 33, Issues 1-6, (Jun. 2000), 723-745.

(56) References Cited

OTHER PUBLICATIONS

Hatley, John W., "Automatically Generating Procedure Code and Database Maintenance Scripts", Ingres World, Chicago, IL, (Oct. 2-6, 1994), pp. 1-11.
Microsoft Press, "Microsoft Computer Dictionary", 4th Edition, Redmond, WA, (1999), pp. 123 and 183.
Schlee, Max, et al., "Generative Programming of Graphical User Interfaces", 2004, ACM, pp. 403-406.
U.S. Appl. No. 11/322,400, Non Final Office Action mailed May 23, 2008, 9 pgs.
U.S. Appl. No. 11/322,400, Notice of Allowance mailed May 18, 2009, 7 pgs.
U.S. Appl. No. 11/322,401, Advisory Action mailed Feb. 26, 2009, 5 pgs.
U.S. Appl. No. 11/322,401, Final Office Action mailed Nov. 19, 2008, 7 pgs.
U.S. Appl. No. 11/322,401, Non Final Office Action mailed May 21, 2009, 10 pgs.
U.S. Appl. No. 11/322,401, Non Final Office Action mailed May 22, 2008, 7 pgs.
U.S. Appl. No. 11/322,401, Notice of Allowance mailed Dec. 31, 2009, 4 Pgs.
U.S. Appl. No. 11/322,401, Preliminary Amendment filed Mar. 16, 2009, 11 pgs.
U.S. Appl. No. 11/322,401, Response filed Feb. 19, 2009 to Final Office Action mailed Nov. 19, 2008, 7 pgs.
U.S. Appl. No. 11/322,401, Response filed Aug. 22, 2008 to Non Final Office Action mailed May 22, 2008, 17 pgs.
U.S. Appl. No. 11/322,401, Response filed Sep. 16, 2009 to Non Final Office Action mailed May 21, 2009, 10 pgs.
U.S. Appl. No. 11/322,607, Non Final Office Action Jun. 26, 2008, 15 pgs.
U.S. Appl. No. 11/322,607, Non Final Office Action mailed Jan. 8, 2008, 10 pgs.
U.S. Appl. No. 11/322,608, Final Office Action mailed Jul. 8, 2009, 9 pgs.
U.S. Appl. No. 11/322,701, Final Office Action mailed Sep. 2, 2008, 16 pgs.
U.S. Appl. No. 11/322,701, Non-Final Office Action mailed Jul. 6, 2009, 15 pgs.
U.S. Appl. No. 11/322,969, Non-Final Office Action mailed Apr. 1, 2009, 11 pgs.
U.S. Appl. No. 11/322,969, Response filed Jun. 9, 2009 to Non Final Office Action mailed Apr. 1, 2009, 11 pgs.
U.S. Appl. No. 11/323,110 , Notice of Allowance mailed Oct. 10, 2009, 6 pgs.
U.S. Appl. No. 11/323,110, Non Final Office Action mailed Nov. 26, 2008, 10 pgs.
U.S. Appl. No. 11/323,110, Notice of Allowance mailed May 29, 2009, 9 pgs.
U.S. Appl. No. 11/323,110, Response filed Feb. 25, 2009 to Non Final Office Action mailed Nov. 26, 2008, 9 pgs.
U.S. Appl. No. 11/323,110, Response filed Oct. 27, 2008 to Restriction Requirement mailed Aug. 27, 2008, 10 pgs.
U.S. Appl. No. 11/323,110, Restriction Requirement mailed Aug. 27, 2008, 7 pgs.
International Application Serial No. PCT/EP2006/012356, International Search Report and Written Opinion mailed Mar. 29, 2007, 8 pgs.
Feller, Peter H., "Software Process Support Through Software Configuration Management", *IEEE*, (1990), 58-60.
Hall, et al., "Design: A Generic Configuration Shell, Proc of the 3rd International Conf. on industrial and engineering applications of artificial intelligence and expert systems", vol. 1, Charleston, SC 1990, 500-508 pgs.
Karlsson, et al., "Method Configuration: Adapting to situational characteristics while creating reusable assets", *Information and software technology*, vol. 46, Issue 9, (Jul. 1, 2004), 619-633 pgs.
Leffler, et al., "Building Berkeley UNIX Kernels with Config", *Computer Systems research Group*, (Apr. 17, 1991), 2-1 and 2-31 pgs.
Robbins, et al., "Unix in a nutshell", *3rd edition*, O'Reily & Associates, Inc, (Aug. 1999), 215-221 and 265-266 pgs.
Schwanke, et al., "Configuration Management in BiiN SMS", *Proc. of the 11th International Conf. on software engineering* Pittsburgh, (383-393 pgs), 1989.
Symantec, Corp., "Norton Ghost™ User's Guide", *Norton Ghost™ User's Guide—Symantec. Norton Ghost The fast pc cloning solution.*, (1999), 138 pgs.
Williams, et al., "Embedded Linux as a platform for dynamically self-reconfiguration systems-On-Chip", (21-24 pgs), 163-169 pgs.
U.S. Appl. No. 11/322,401, Ex-Parte Reexamination Office Action Mailed Mar. 30, 2010, 9 pgs.

* cited by examiner

METHOD AND SYSTEM USING PARAMETERIZED CONFIGURATIONS

BACKGROUND OF THE INVENTION

1. Field

The invention relates to virtual system configuration. More specifically, the invention relates to abstracting configuration data to reduce administration.

2. Background

With various enterprise software solutions improved scalability and reduced administration have been the goal. One countervailing force to this goal is the distribution of configuration data within the system. Existing systems redundantly store static values for system dependent information distributed across a cluster configuration tree. These system dependent settings are statically determined within the configuration database. This requires manual intervention responsive to system change. For example, with system copy, the requirement of manual adaptation makes it impossible to use a configuration as it is from one system to another. Even minor changes, such as a change in Java Home, System Name, Instance Number, Host Name, etc., requires manual adjustment. Moreover, changes in configuration data often necessitate onsite visits by software technicians to provide the correct configuration data for an appropriate system operation. This drives up the cost of changing, scaling or even maintaining a system.

SUMMARY OF THE INVENTION

A system and method to reduce configuration redundancy using system independent configuration references is disclosed. A persistent storage unit returns system independent configuration entries. Some of the entries contain reference to other entries. A configuration resolver resolves the references to obtain a static value for the configuration entry that may be passed to a configuration consumer.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
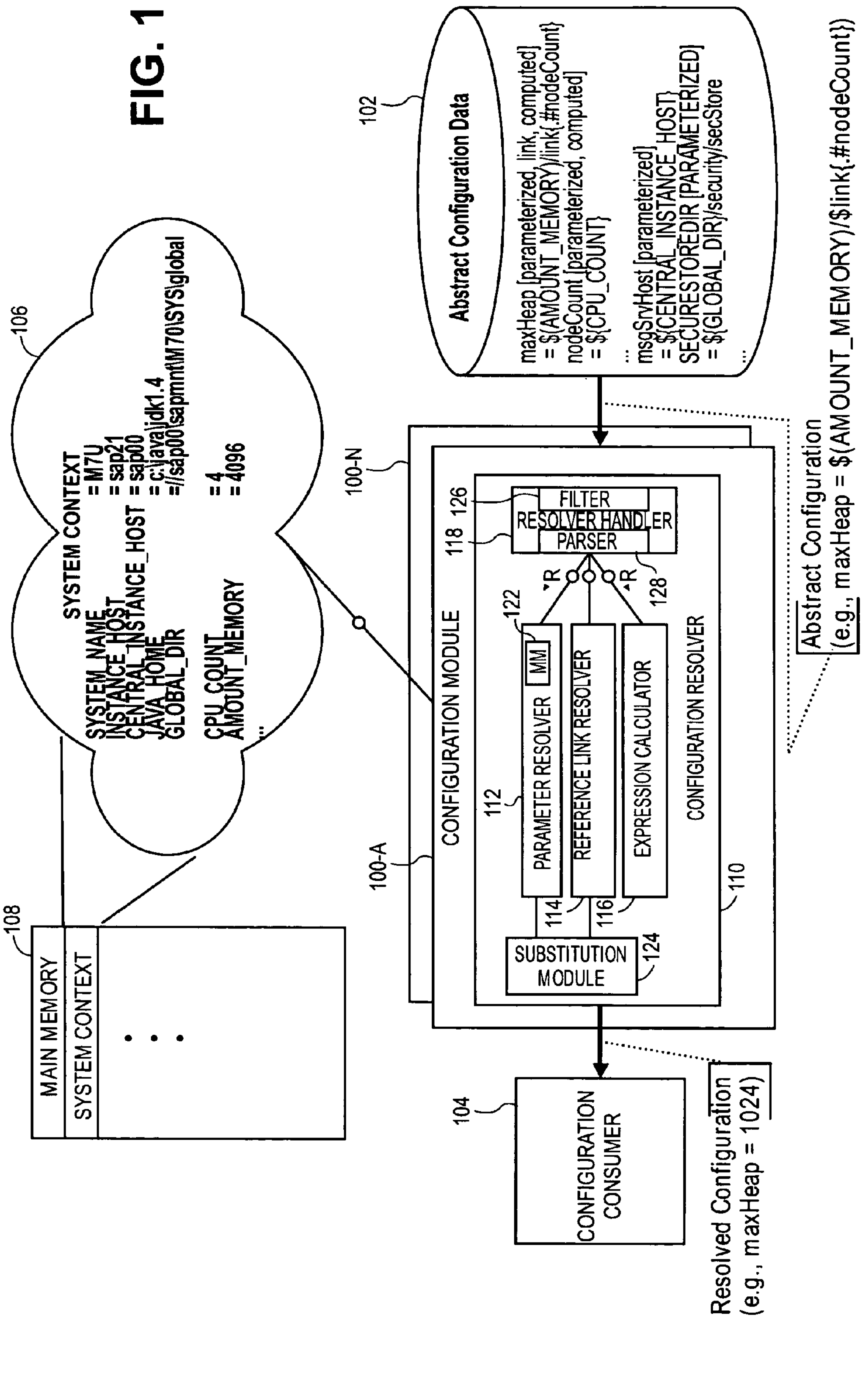
FIG. 1 is a block diagram of the system of one embodiment of the invention.

FIG. 1 is a block diagram of the system of one embodiment of the invention. The configuration module 100 includes a configuration resolver 110. Configuration resolver 110 is used to resolve abstract configuration data, which is stored persistently in the database 102. By resolving, it is meant that the abstract expression having a known semantic is converted to a static value to pass to a configuration consumer 104. In various embodiments, configuration consumer 104 may be a manager, a service or an application. Typically, in a cluster environment, each server node will have a configuration module 100, 100-N, but only a single configuration database 102 will be shared amongst the nodes in the cluster. In some embodiments, the cluster is homogenous, such that the same configuration is applied to all of the nodes in the cluster. In such case, the abstract configuration described below is of a particular benefit in reducing redundancy. At system start-up, configuration module 100 creates system context 106, which is stored in main memory 108. The system context 106 associates identifiers with static values that may be a function of the underlying hardware. Different system contexts can be attached to the same configuration data as a result of, for example, system copy. Because the configuration data is abstracted away from underlying system dependencies and only resolved to a static value at run time, reuse is simplified. In one embodiment, the system context is created using instance profiles for instances of the system. In one embodiment, the system context contains system dependencies such as, host names, operating system (O/S) information, installation directories, etc. The system context may also contain hardware dependencies such as, number of CPU, amount of physical memory, etc.

In one embodiment, configuration resolver includes a resolver handler 118, which filters incoming configuration data from database 102 using a filter 126 to identify if the configuration should be passed to a parser 128 within the resolver handler. Parser 128 identifies the semantic of various abstract configuration components and calls an appropriate resolver within the configuration resolver 110 to resolve those components.

For example, in one embodiment, configuration resolver 110 includes a parameter resolver 112, a reference link resolver 114 and an expression calculator 116. In one embodiment, parameters are semantically reflected as ${identifier}. When the parser finds that semantic within a configuration entry, the call is made to the parameter resolver 112 to obtain a static value for that parameter. To obtain a static value for the parameter, parameter resolver 112 uses a matching module 122 to match the identifier against an identical identifier in the system context 108 and retrieve the corresponding static value from the system context 108. The static value is then substituted for the parameter in the configuration entry. The static value may then be returned to the resolver handler 110 or if a particular configuration data is fully resolved by virtue of the resolution of the parameter, the resulting static value may be passed to configuration consumer 104.

If the parser 128 finds a reference link abstraction within the configuration entry, a call is made to reference link resolver 114. In one embodiment, the semantic for a reference link is $link {pathname}. Reference link resolver 114 follows the path and substitutes the value obtained at the end of the path using substitution module 124 to provide a static value or possibly substitute a parameter as explained below. The path can be either absolute or relative. Relative paths facilitate inheritance. For example, a configuration B is derived from configuration A. A contains a config entry a='a' and a reference link alink='.#a' Configuration B overwrites value "a" to a='b'. Therefore, value alink in configuration A will be resolved to 'a', but the inherited value alink in configuration B it will be resolved to 'b'. In one embodiment, the path generally points to another configuration entry in the configuration tree, which may itself be an abstract configuration entry requiring further resolution. Thus, for example, $link{#nodeCount} points to the configuration entry node count, which is equal to ${cpu_count}. In this case, node count will finally resolve to 4, but maxHeap is discerned by first calling the parameter resolver 112 to obtain the Amount Memory which is 4,096. Then resolver manager 118 calls the reference resolver link 114 to follow the link to nodeCount, which returns the parameterized value CPU_COUNT. The resolver manager 118 again calls the parameter resolver 112 to which resolver context CPU_COUNT to 4 with reference to the system. Then the two static values for AMOUNT_MEMORY (4096) and CPU_COUNT (4) are passed with the call to expression calculator 116 to conduct the division.

Expression calculator 116, in one embodiment, performs simple arithmetic functions such as, add, subtract, multiply, divide, min, max, round and truncate. More or fewer arithmetic operations may be supported. In the above example, when the static value of maxHeap is finally calculated by the expression calculator 116, it may be passed to configuration consumer 104. Thus, in one embodiment, resolver handler 118 calls the individual resolvers 112, 114 and 116 sequentially as needed to resolve abstract configuration data into a static value that may be passed to a configuration consumer 104 at run time. It should be noted that the resolver handler 118 need not call every resolver and calls in parallel or a different order than the example above may occur.

In one embodiment, when the system starts up, a system context is created. In one embodiment, the system context is stored in main memory. This activity is all part of the initialization process and is decoupled from the subsequent steady state operation of the system.

Figure 2:
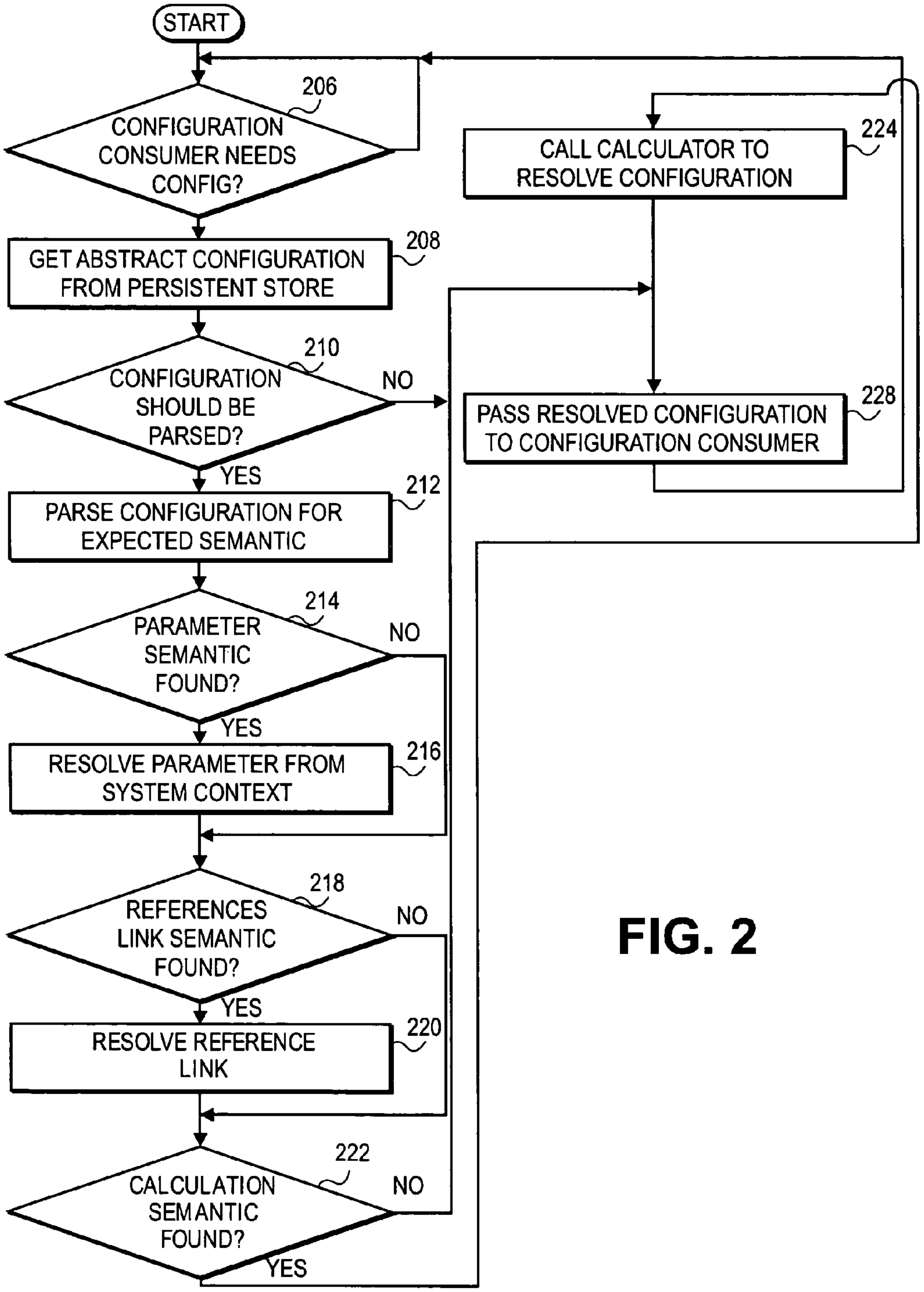
FIG. 2 is a flow diagram of one embodiment of the invention.

FIG. 2 is a flow diagram of one embodiment of the invention. At block 206, a decision is made whether a configuration consumer needs configuration data. If not, the system waits at 206 until configuration data is needed.

At block 208, abstract configuration data is retrieved from a persistent store. In one embodiment, the persistent store is a database. At decision block 210, the determination is made whether the configuration data obtained from the persistent store should be parsed. For example, it is possible that configuration data may have a form that is analogous to the semantic that would require parsing, but should otherwise not be parsed because it is already the value that should be passed as the static configuration value to the configuration consumer. In such case, the filter bypasses the parser and forwards the configuration data to the configuration consumer without parsing.

If the configuration data should be parsed, at block 212 the configuration is parsed to identify the expected semantic. While one possible semantic for parameters and reference links is set forth above, any suitable semantic identifiable by the parser may be used. At block 214, a determination is made whether a parameter semantic is found. If so, the parameter is resolved with reference to the system context at block 216. At block 218, a determination is made if a reference link semantic is found. If so, at block 220, the reference link is resolved. Resolution of the reference link is described in further detail with reference to FIG. 2A below. At block 222, a determination is made if the calculation semantic is found. In which case, at block 224 an expression calculator is called to resolve the configuration entry. The static value is passed to the configuration consumer at block 228. In one embodiment, a call to e.g., resolve references or resolve parameters resolves all references or parameters in the configuration entry at once. In one alternative embodiment, the resolver may be called iteratively until the configuration is fully resolved. It should be recognized that a configuration entry may include more than one reference link and/or parameter.

Figure 2A:
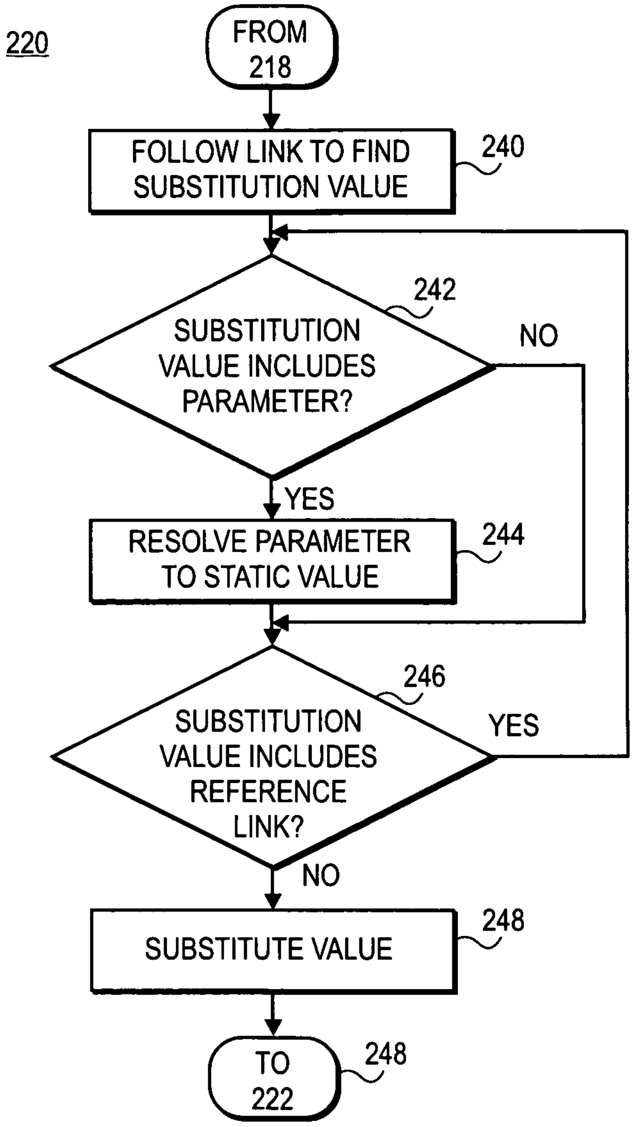
FIG. 2A is a flow diagram of resolution of a reference link in one embodiment to the invention.

FIG. 2A is a flow diagram of resolution of a reference link in one embodiment to the invention. At block 240, the link is followed to find a value to be substituted in the configuration entry. This value may be a static value, a parameterized value, another value link or an arithmetic expression. At decision block 242, a determination is made if the substitution value contains a parameter. If so, at block 244, the parameter is resolved to a static value. After parameter resolution or if no parameter is present, at block 246, a determination is made whether the substitution value includes a reference link. If a reference link is present, it recursively follows the flow continuing at block 240. If no reference link is present, the substitution value (w/any parameters resolved) is substituted in the configuration entry for the original reference link. In this manner, any depth of linking may be accommodated.

Figure 3:
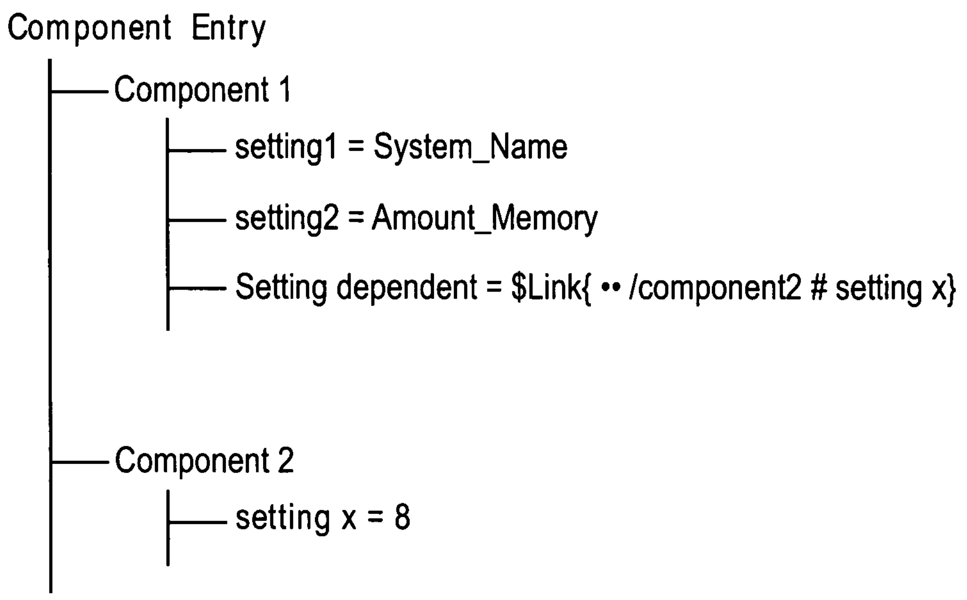
FIG. 3 is a diagram of a partial configuration tree of one embodiment of the invention.

FIG. 3 is a partial configuration tree of one embodiment of the invention. FIG. 3 shows a reference link in component, to configuration value component$_2$. This illustrates how one of reference links can reduce the redundancy of system specific values within the configuration tree. While in this example, the value of the linked setting is short, in some cases longer values may result in memory saving by using the links. In any case, the administration of e.g., this single static value is less than if the static value were redundantly distributed throughout the configuration tree.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:

a database to persistently store a plurality of system-independent configuration entries;

a first configuration module, running in a first server node at a cluster and coupled to the database, the first configuration module to resolve a parameterized value of a configuration entry of the plurality of system independent configuration entries into a first static value based on a first system context, the first system context specifying a value of a hardware attribute of a first configuration consumer upon which the resolving of the parameterized value of the first configuration entry into the first static value depends, the first configuration module comprising a parser to parse the first configuration entry to identify the parameterized value and a matching module to match the value of the hardware attribute to the parameterized value;

a second configuration module, running in a second server node at the cluster and coupled to the database, the second configuration module to resolve the parameterized value of the configuration entry of the plurality of system independent configuration entries into a second static value based on a second system context, the second system context specifying a value of a hardware attribute of a second configuration consumer upon which the resolving of the parameterized value of the first configuration entry into the second static value depends, the second configuration module implemented by one or more processors;

the first configuration consumer coupled to the first configuration module to receive distribution of the first static value from the first configuration module; and the second configuration consumer coupled to the second configuration module to receive distribution of the second static value from the second configuration module, the resolving of the configuration entry into the first static value and the resolving of the configuration entry into the second static value reducing a redundancy of system-specific values stored in the database.

2. The system of claim 1, wherein the first configuration module further comprises a filter to selectively prevent configuration entries from being passed to the parser.

3. The system of claim 1, wherein the first configuration module is to create the first system context when the server node starts up and wherein the system further comprises a file system to retain the first system context.

4. The system of claim 1, wherein the first configuration consumer comprises one of:

an application;

a manager; and a service.

5. A method comprising:

storing a plurality of system-independent configuration entries in a database;

resolving, in a first server node at a cluster, a parameterized value of a configuration entry of the plurality of system independent configuration entries into a first static value based on a first system context, the first system context specifying a value of a hardware attribute a first configuration consumer upon which the resolving of the parameterized value of the first configuration entry into the first static value depends, the resolving including parsing the first configuration entry to identify the parameterized value and matching the value of the hardware attribute to the parameterized value;

resolving, in a second server node at the cluster, the parameterized value of the configuration entry of the plurality of system independent configuration entries into a second static value based on a second system context, the second system context specifying a value of a hardware attribute of a second configuration consumer upon which the resolving of the parameterized value of the first configuration entry into the second static value depends, the resolving of the configuration entry into the first static value and the resolving of the configuration entry into the second static value being implemented by one or more processors and reducing a redundancy of system-specific values stored in the database;

distributing the first static value from the first configuration module to the first configuration consumer; and distributing the second static value from the second configuration module to the second configuration consumer.

6. The method of claim 5, further comprising creating the first system context when the server node starts up and retaining the first system context in a file system.

7. The system of claim 5, wherein the first configuration consumer comprises one of:

an application;

a manager; and a service.

8. The method of claim 5, further comprising:

identifying a plurality of static values corresponding to system configuration features, the first static value being one of the plurality of static values; and storing each of the plurality of static values in association with an identifier.

9. The method of claim 8, further comprising retaining the plurality of static values as a file in a file system.

10. The method of claim 5, the operations further comprising creating the first system context using instance profiles for instances in a system.

11. The method of claim 5, further comprising using a filter to prevent parsing of some configuration entries.

12. The method of claim 5, wherein the abstract configuration entry includes a link to find at least one of a parameterized value, a value link, and an arithmetic expression.

13. The method of claim 5, further comprising determining that the abstract configuration entry is not in a form that is to be passed as the first static value to the first configuration consumer without parsing despite the abstract configuration entry being in a form that is analogous to a semantic that is to be parsed.

14. A non-transitory machine-readable storage medium comprising a set of instructions that, when executed by one or more processors, causes the one or more processors to perform operations, the operations comprising:

storing a plurality of system-independent configuration entries in a database;

resolving, in a first server node at a cluster, a parameterized value of a configuration entry of the plurality of system independent configuration entries into a first static value based on a first system context, the first system context specifying a value of a hardware attribute a first configuration consumer upon which the resolving of the parameterized value of the first configuration entry into the first static value depends, the resolving including parsing the first configuration entry to identify the parameterized value and matching the value of the hardware attribute to the parameterized value;

resolving, in a second server node at the cluster, the parameterized value of the configuration entry of the plurality of system independent configuration entries into a second static value based on a second system context, the second system context specifying a value of a hardware attribute of a second configuration consumer upon which the resolving of the parameterized value of the first configuration entry into the second static value depends, the resolving of the configuration entry into the first static value and the resolving of the configuration entry into the second static value reducing a redundancy of system-specific values stored in the database;

distributing the first static value from the first configuration module to the first configuration consumer; and distributing the second static value from the second configuration module to the second configuration consumer.

15. The non-transitory machine-readable storage medium of claim 14, further comprising creating the first system context when the server node starts up and retaining the first system context in a file system.

16. The non-transitory machine-readable storage medium of claim 14, wherein the first configuration consumer comprises one of:

an application;

a manager; and a service.

17. The non-transitory machine-readable storage medium of claim 14, further comprising:

identifying a plurality of static values corresponding to system configuration features, the first static value being one of the plurality of static values; and storing each of the plurality of static values in association with an identifier.

18. The non-transitory machine-readable storage medium of claim 17, further comprising retaining the plurality of static values as a file in a file system.

19. The non-transitory machine-readable storage medium of claim 14, the operations further comprising creating the first system context using instance profiles for instances in a system.

20. The non-transitory machine-readable storage medium of claim 14, further comprising using a filter to prevent parsing of some configuration entries.

21. The non-transitory machine-readable storage medium of claim 14, wherein the abstract configuration entry includes a link to find at least one of a parameterized value, a value link, and an arithmetic expression.

22. The non-transitory machine-readable storage medium of claim 14, further comprising determining that the abstract configuration entry is not in a form that is to be passed as the first static value to the first configuration consumer without parsing despite the abstract configuration entry being in a form that is analogous to a semantic that is to be parsed.

* * * * *